Feb. 23, 1954     W. H. SHAFFER ET AL     2,669,882
VEHICLE STEERING WHEEL LOCKING DEVICE
Filed April 20, 1951
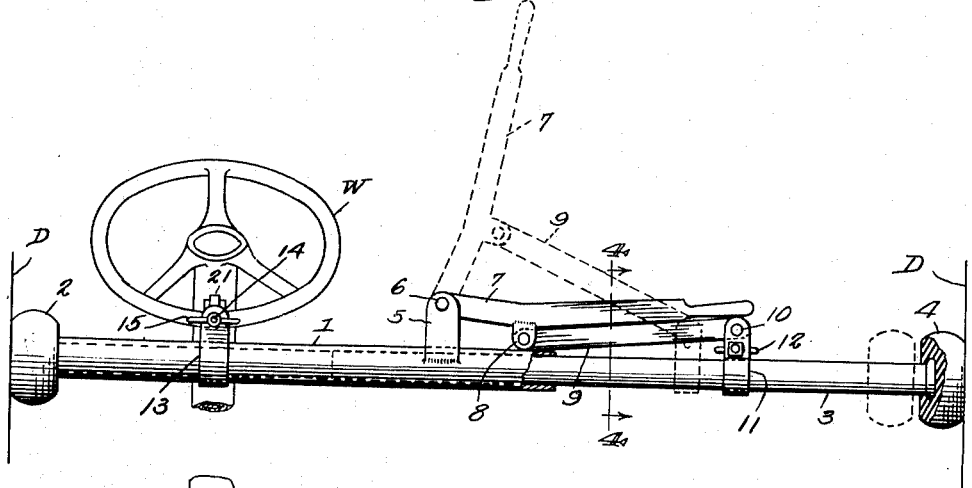
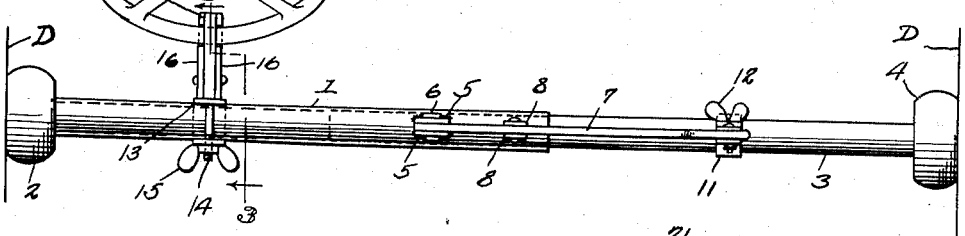
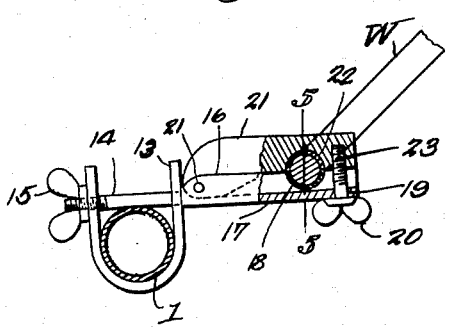
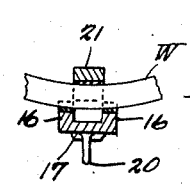
W. H. Shaffer
W. Stenger
INVENTORS,
BY *Clsnow &Leo.*
ATTORNEYS.

Patented Feb. 23, 1954

2,669,882

UNITED STATES PATENT OFFICE 2,669,882

VEHICLE STEERING WHEEL LOCKING DEVICE

William H. Shaffer, Birch Run, and William Stenger, Bridgeport, Mich.

Application April 20, 1951, Serial No. 222,088

1 Claim. (Cl. 74—495)

This invention relates to a locking device for automobile steering wheels, the device being adapted for clamping to a steering wheel when a vehicle is to be towed, for the purpose of preventing accidental turning of the front wheels of the vehicle.

Many present day automobiles are equipped with automatic fluid transmissions, and these must be towed backwardly, that is, with the rear wheels elevated. This is due to the fact that serious damage can be caused to the transmission of a vehicle equipped in this manner, if the rear wheels are permitted to turn at any time when the vehicle is not moving under its own power.

It has been found that when a vehicle is towed in this manner, it is essential that the front wheels, on which the vehicle is being pulled, be locked against turning. For example, if the front wheels are not locked in this manner, and the towed vehicle strikes a rut disposed obliquely to the line of movement, one of the front wheels will strike said rut before the other, causing a sudden turning of the front wheels, with the result that the towed vehicle may swing laterally and strike an object such as a tree or pole.

The main object of the present invention is to provide a locking device for automobile steering wheels, that will be capable of being applied readily and swiftly to a vehicle to be towed, whereby to clamp the steering wheel rigidly against movement and insure the holding of the front wheels of the vehicle in a straight line.

Another important object is to provide a device of the character described which will exert a positive, strong clamping action upon the vehicle steering wheel, so as to prevent accidental turning of the front wheels of the vehicle regardless of the pressures that may be exerted thereupon tending to turn said wheels.

Still another important object is to provide a device as stated which can be manufactured at relatively low cost, will not mar the vehicle upholstery or steering wheel, and which will be adjustable to be locked to the steering wheel and body of a vehicle, regardless of the particular make, year, or body style of said vehicle.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings,

Fig. 1 is an elevational view of the device, as it appears when operatively positioned in relation to a vehicle steering wheel and door panels, the dotted lines indicating an unlocked position of the supporting bar of the device.

Fig. 2 is a top plan view.

Fig. 3 is an enlarged section taken substantially on line 3—3 of Fig. 2 and illustrating the steering wheel clamp.

Fig. 4 is a section taken on an enlarged scale substantially on line 4—4 of Fig. 1.

Fig. 5 is a section taken substantially on line 5—5 of Fig. 3.

Referring to the drawings in detail, D represents door panels of any vehicle, the vehicle being equipped with the usual steering wheel W.

In accordance with the present invention, there is provided a support extending transversely between and engaged against the respective door panels D, and said support comprising telescoping members. An outer bar member 1 is formed of tubular material, and at one end is provided with a rubber foot 2 engageable against the door panel D. The rubber foot 2 is formed from soft rubber, so as to prevent marring of the door panel upholstery.

Telescoping in the other end of the outer bar member 1 is an inner rod 3 also of tubular material, this being provided with a rubber foot 4 similar to the foot 2 and engageable against the other panel D.

Welded or otherwise fixedly secured to the bar member 1 are upstanding ears 5 constituting a pivot bracket having openings at its upper end through which extends a pivot bolt 6, for pivotal connection to the bracket of one end of an operating lever 7.

As may be noted from Fig. 1, the operating lever 7 is not straight from end to end, but rather, has a depressed intermediate portion, and made rigid with the depressed portion of the operating lever, as by welding or the like, are depending bracket arms 8 to which is pivotally connected one end of a link 9. The other end of the link 9 is pivotally connected as at 10 to the upstanding arms of a split sleeve clamp 11 capable of being clamped to the rod 3 at any point longitudinally of said rod, by means of a thumb screw 12.

As may be noted by reference to Fig. 1, when the support is applied to the vehicle, the operating lever 7 will initially be in the dotted line position. As a result, the overall length of the support is reduced, so as to enable the support to be easily fitted between the door panels D. Then, the operating lever 7 is swung to the full line position illustrated in Fig. 1. As a result, the rod 3 will be urged outwardly of the bar member 1, and by reason of the depressed intermediate portion of the lever 7, the link and lever will be thrown past a dead center, causing a snap-lock action, whereby the feet 2 and 4 are pressed outwardly relative to each other, against the respective door panels D, rigidly holding the support bar in place.

Means are provided for locking the steering wheel W to the support, and to this end I provide a U-clamp 13, extending around the bar member 1, and having upstanding portions between which extends a threaded stud 14, the upstanding portions of the U-clamp having smooth-walled openings receiving said stud.

When the U-clamp 13 has been adjusted to a selected position longitudinally of the support bar, wing nut 15 is operated to clamp the steering wheel clamping unit rigidly to the support bar, said wing nut being threadable upon the stud 14.

The stud 14 is rigid at its other end with a channeled clamp member having side walls 16 rigid with a bottom wall 17. The clamp member is provided with approximately semi-circular recesses 18 formed in the respective side walls and aligned transversely of the side walls, the edges of these recesses being rubberized to prevent marring of a steering wheel W received therein.

Th recesses are disposed near the outer end of the channeled clamp member, and at the outer end of the clamp member, a smooth-walled opening 19 is formed in the bottom wall 17, receiving thumb screw 20.

Swingable in the position between the respective side walls 16 is a cooperating clamp member 21, in the form of a clamping bar, this having a rubberized recess 22 disposed oppositely to the recesses 18. At the outer end of the clamp bar 21 there is formed a threaded socket 23 receiving the thumb screw 20.

The inner end of the clamp bar 21 is pivotally connected to the channeled clamp member, so that the clamp bar can be swung upwardly and downwardly relative to the channeled lower clamp member.

It may be noted that the steering wheel clamp comprising the clamp members 17 and 21 is rotatable relative to the support bar, since the stud 14 can turn or swivel in the openings of the U-clamp 13.

I believe that the operation of clamping the device to a steering wheel will be readily apparent. As previously noted, the steering wheel clamp is adjusted bodily longitudinally of the support bar, after which the clamp bar 21 is swung downwardly upon the steering wheel, and the thumb screw 20 threaded upwardly to clamp the portions of the clamp tightly to the steering wheel.

The vehicle may now be towed, and the front wheels will be securely locked against any possibility of accidental turning.

What is claimed is:

Means for locking the steering wheel of a vehicle against rotation about its axis comprising an elongated tubular bar, a cushion carried by one end of said bar for engaging one side wall of a vehicle, an elongated rod, a cushion carried by one end of the rod for engaging the opposite side wall of the vehicle, the end of the rod remote from the cushioned end thereof telescopically entering the uncushioned end of the bar, a hand lever mounted on the bar adjacent the uncushioned end thereof for movement in an arcuate path adjacent one side of said bar, an elongated link pivotally connected adjacent one end to the lever intermediate the ends thereof, mans carried by the link adjacent the opposite end thereof and embracing the rod for moving said rod as the lever is moved, and means carried by the bar and projecting laterally therefrom for engaging the steering wheel of the vehicle and holding it against rotation.

WILLIAM H. SHAFFER.
WILLIAM STENGER.

References Cited in the file of this patent

UNITED STATES PATENTS

| Number | Name | Date |
| --- | --- | --- |
| 457,183 | Covert | Aug. 4, 1891 |
| 1,140,141 | Fagan | May 18, 1915 |
| 1,510,957 | Perry | Oct. 7, 1924 |
| 2,202,585 | Jordan | May 28, 1940 |
| 2,531,675 | Field | Nov. 28, 1950 |